US010173895B2

(12) United States Patent
Ostuni et al.

(10) Patent No.: US 10,173,895 B2
(45) Date of Patent: Jan. 8, 2019

(54) PROCESS FOR PRODUCING AMMONIA SYNTHESIS GAS WITH HIGH TEMPERATURE SHIFT AND LOW STEAM-TO-CARBON RATIO

(71) Applicant: Casale SA, Lugano (CH)

(72) Inventors: Raffaele Ostuni, Lugano (CH); Ermanno Filippi, Castagnola (CH)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 14/889,943

(22) PCT Filed: May 5, 2014

(86) PCT No.: PCT/EP2014/059055
§ 371 (c)(1),
(2) Date: Nov. 9, 2015

(87) PCT Pub. No.: WO2014/180763
PCT Pub. Date: Nov. 13, 2014

(65) Prior Publication Data
US 2016/0115017 A1 Apr. 28, 2016

(30) Foreign Application Priority Data
May 10, 2013 (EP) ..................................... 13167211

(51) Int. Cl.
C01B 3/02 (2006.01)
C01B 3/38 (2006.01)
(Continued)

(52) U.S. Cl.
CPC ................ C01B 3/025 (2013.01); C01B 3/34 (2013.01); C01B 3/36 (2013.01); C01B 3/382 (2013.01);
(Continued)

(58) Field of Classification Search
None
See application file for complete search history.

(56) References Cited

U.S. PATENT DOCUMENTS 4,296,085 A 10/1981 Banquy
4,910,007 A 3/1990 Pinto et al.
(Continued)

FOREIGN PATENT DOCUMENTS

EP 1 337 466 B1 5/2004
EP 1 690 826 A2 8/2006
(Continued)

OTHER PUBLICATIONS

International Search Report issued in connection with PCT/EP2014/059055.
(Continued)

Primary Examiner — Wayne A Langel
(74) Attorney, Agent, or Firm — Akerman LLP

(57) ABSTRACT

A process for producing ammonia synthesis gas from a hydrocarbon-containing feedstock in a front-end, comprising the steps of steam reforming of said feedstock, obtaining a synthesis gas comprising hydrogen, carbon monoxide and carbon dioxide; a treatment of said synthesis gas including shift of carbon monoxide and subsequent removal of carbon dioxide, wherein the shift of the synthesis gas includes high-temperature shift with an iron-based catalyst and at a temperature greater than 300° C. and the global steam-to-carbon ratio of the front end is 2.6 or less; a corresponding plant and a method for revamping a front-end of an ammonia plant are also disclosed.

23 Claims, 5 Drawing Sheets

(51) Int. Cl.
  *C01B 3/48* (2006.01)
  *C01B 3/34* (2006.01)
  *C01B 3/36* (2006.01)
  *C01C 1/04* (2006.01)

(52) U.S. Cl.
  CPC ............... *C01B 3/384* (2013.01); *C01B 3/48* (2013.01); *C01B 2203/025* (2013.01); *C01B 2203/0233* (2013.01); *C01B 2203/0244* (2013.01); *C01B 2203/0283* (2013.01); *C01B 2203/0288* (2013.01); *C01B 2203/0475* (2013.01); *C01B 2203/068* (2013.01); *C01B 2203/1047* (2013.01); *C01B 2203/1241* (2013.01); *C01B 2203/141* (2013.01); *C01B 2203/142* (2013.01); *C01B 2203/143* (2013.01); *C01C 1/0405* (2013.01)

(56) References Cited

U.S. PATENT DOCUMENTS

| | | | | |
|---|---|---|---|---|
| 8,124,049 B2* | 2/2012 | Grover | ............... | C01B 3/38 252/373 |
| 8,323,363 B2* | 12/2012 | Bingue | ............... | B01J 8/025 422/129 |
| 9,102,534 B2* | 8/2015 | McKenna | ............... | C01B 3/382 |
| 2006/0013759 A1* | 1/2006 | Jiang | ............... | B01J 8/009 423/648.1 |
| 2006/0188435 A1* | 8/2006 | Herb | ............... | C01B 3/38 423/652 |
| 2008/0241059 A1* | 10/2008 | Peng | ............... | C01B 3/382 423/652 |
| 2009/0232728 A1* | 9/2009 | Wagner | ............... | B01J 23/36 423/648.1 |
| 2010/0132259 A1 | 6/2010 | Haque | | |
| 2010/0260657 A1* | 10/2010 | Niitsuma | ............... | B01D 53/226 423/437.1 |
| 2010/0264373 A1* | 10/2010 | Licht | ............... | C01B 3/382 252/373 |
| 2011/0101277 A1* | 5/2011 | Schiodt | ............... | B01J 23/002 252/373 |
| 2011/0206594 A1* | 8/2011 | Singh | ............... | C01B 3/025 423/361 |
| 2012/0039794 A1* | 2/2012 | Catchpole | ............... | C01B 3/382 423/653 |
| 2013/0008175 A1 | 1/2013 | McKenna | | |
| 2014/0103260 A1* | 4/2014 | Iaquaniello | ............... | C01B 3/386 252/373 |
| 2014/0117287 A1* | 5/2014 | Ariyapadi | ............... | B01J 7/00 252/373 |
| 2014/0291581 A1* | 10/2014 | Iaquaniello | ............... | C01B 3/384 252/373 |

FOREIGN PATENT DOCUMENTS

| | | |
|---|---|---|
| EP | 2 022 754 A1 | 2/2009 |
| EP | 1 751 080 B1 | 12/2009 |
| EP | 2 186 778 A1 | 5/2010 |
| EP | 2 404 869 A1 | 1/2012 |

OTHER PUBLICATIONS

International Preliminary Report on Patentability issued in connection with PCT/EP2014/059055.

* cited by examiner

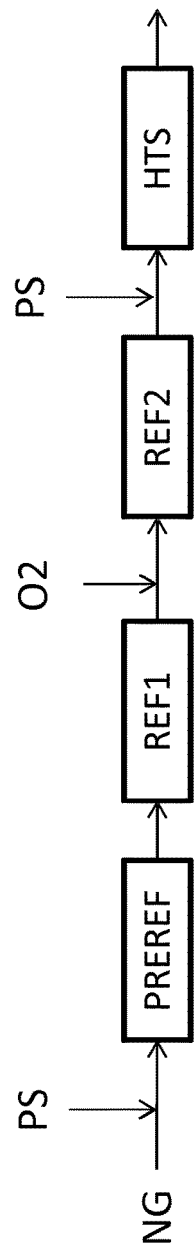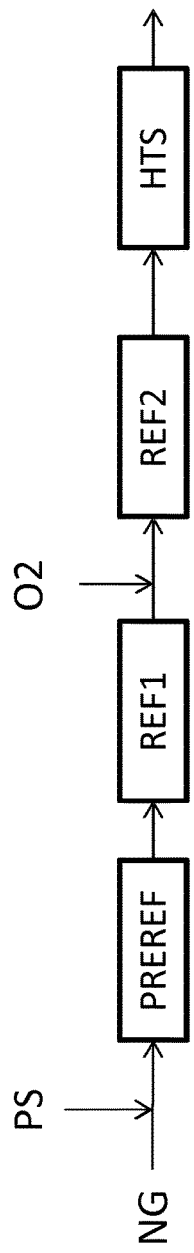

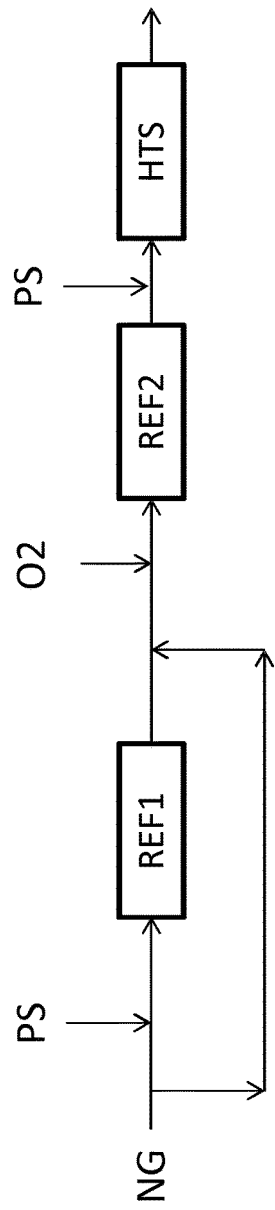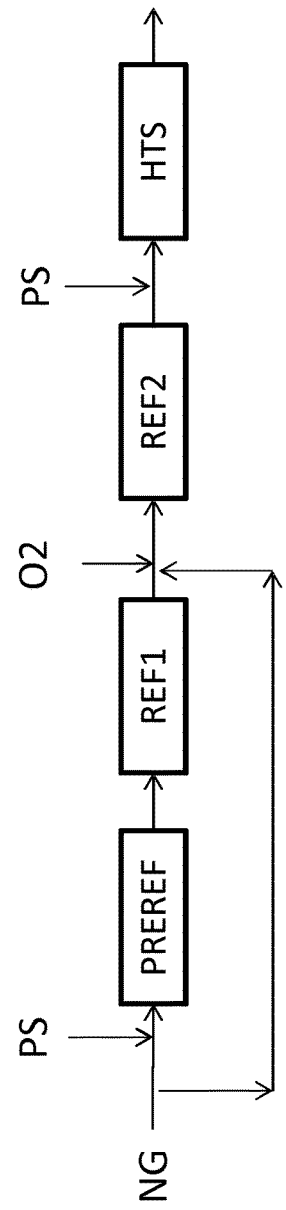

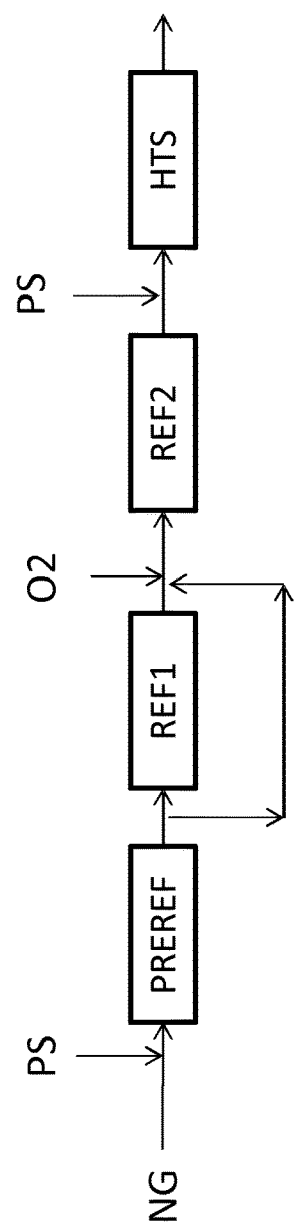

PROCESS FOR PRODUCING AMMONIA SYNTHESIS GAS WITH HIGH TEMPERATURE SHIFT AND LOW STEAM-TO-CARBON RATIO

This application is a national phase of PCT/EP2014/059055, filed May 5, 2014, and claims priority to EP 13167211.5, filed May 10, 2013, the entire contents of both of which are hereby incorporated by reference.

FIELD OF THE INVENTION

The invention relates to reforming of hydrocarbons for the preparation of a synthesis gas for the production of ammonia.

PRIOR ART

The synthesis of ammonia ($NH_3$) requires a synthesis gas comprising hydrogen ($H_2$) and nitrogen ($N_2$) in a suitable ratio of about 3:1. The term ammonia syngas will be used with reference to a synthesis gas with the above composition.

It is known to produce said ammonia syngas from the reforming of a desulphurized natural gas, by means of a primary steam reforming and subsequent secondary reforming of the effluent, see for example EP 2 022 754.

The gas leaving the secondary reformer needs purification, to remove carbon oxides and residual methane. According to the prior art, said purification includes the shift of the carbon monoxide (conversion of carbon monoxide into carbon dioxide), which is usually carried out in a high-temperature shift converter (HTS) over an iron based catalyst, and then in a low-temperature shift converter (LTS) over a copper based catalyst. The HTS converter operates at around 320-500° C. and the LTS converter operates at around 190-250° C. After the shift, the syngas is treated by carbon dioxide removal and optionally methanation.

An important parameter governing the process is the steam-to-carbon ratio, also referred to as SC ratio. The steam-to-carbon ratio is the molar ratio between water (steam) admitted to the process and the carbon contained in the feedstock of natural gas. The steam is normally admitted upstream of the primary reformer.

There is an incentive to reduce said SC ratio, in order to reduce the flow rate and hence the size of the equipment, and also to reduce the energy consumption.

It is commonly believed that the iron based catalyst of the high-temperature shift cannot operate in a reducing environment, which would deactivate the catalyst and cause undesired formation of by-products. It is believed that the lower limit of SC ratio, to be tolerable by said iron based catalyst, is generally around 2.6-2.8.

For this reason, the SC ratio of a prior art front-end for the production of ammonia syngas by steam reforming with HTS converter is normally around 3.

It has been observed that other parameters influencing the possibility to use an iron based catalyst are the reducing potential RP and steam/dry gas S/DG ratio of the incoming gas. Said parameters are a function of the molar composition of the gas, according to the following definitions:

$$RP=(H_2+CO)/(CO_2+H_2O)$$

$$S/DG=H_2O/(1-H_2O)$$

For use of an iron based catalyst, S/DG should be ideally around 0.4 or higher, and RP should be around 1.7 or lower.

Said SC ratio around 3 is well above the stoichiometric value, since the primary reformer converts methane ($CH_4$) and steam ($H_2O$) into CO and $H_2$ and hence the chemical reaction would theoretically require only one mole of steam for each mole of methane.

The prior art teaches that a steam-to-carbon ratio lower than 2.6 requires necessarily to replace the high-temperature shift catalyst with a copper based medium-temperature shift (MTS) catalyst.

EP 2 404 869, for example, discloses that synthesis gas delivered by secondary reforming is subject to a medium-temperature shift (MTS) over copper-based catalyst at a temperature between 200 and 350° C., and primary reforming is operated with a steam-to-carbon ratio lower than 2. A corresponding method for revamping an ammonia plant is disclosed, where an existing HTS reactor is modified to operate at medium temperature, or replaced with a new MTS reactor, and the steam-to-carbon ratio in the primary reformer is lowered to a value in the range 1-5-2.

The use of an MTS converter instead of HTS converter however may introduce some disadvantages. Indeed, the HTS converter is preferred for some reasons: the iron based HTS catalyst is more resistant to poisoning (e.g. from sulphur) than the copper based MTS catalyst; a HTS converter can operate under a greater difference of temperature between inlet and outlet; the HTS converter is widely used in the front-ends of existing ammonia plants, and their revamping would be easier and less expensive if the existing HTS were maintained.

SUMMARY OF THE INVENTION

The applicant has found that a high-temperature shift converter with an iron based catalyst can be used with a global steam-to-carbon ratio lower than 2.6. This can be made in combination with a pure autothermal reforming (i.e. without any steam reformer), or with a secondary reforming fired with oxygen or oxygen-enriched air instead of air. Preferred values for said steam-to-carbon ratio range from 1.5 to 2.6. In embodiments with primary and secondary reforming, said ratio is preferably 2 to 2.6 and more preferably 2.2 to 2.4. In embodiments with autothermal reforming, said ratio is preferably in the range 1.5 to 2.4 and even more preferably 1.8 to 2.2. Embodiments with autothermal reformer however may have a global steam-to-carbon ratio even less than 1.5, for example in the range 0.5-1.5.

The term of oxygen denotes a substantially pure oxygen flow, with a high degree of purity as obtainable from an air separation unit (ASU). Enriched air denotes air having a content of oxygen which is at least 50% and preferably equal to or more than 90%.

A first aspect of the invention, in accordance to the above, is a process according to claim 1 comprising the steps of:

steam reforming of said feedstock, obtaining a synthesis gas comprising hydrogen, carbon monoxide and carbon dioxide;

a treatment of said synthesis gas including shift of carbon monoxide and subsequent removal of carbon dioxide, characterized in that:

the shift of the synthesis gas includes a step of high-temperature shift with an iron-based catalyst;

the global steam-to-carbon ratio of the front end is 2.6 or less.

The term of global steam-to-carbon ratio is used in this description to denote the ratio between the moles of steam and moles of carbon which are admitted to the process, including any feed of hydrocarbon and any feed of steam up to the inlet of the high temperature shift. Hence said global ratio is calculated for the overall process, and takes into account all additional feeds of steam, when provided. Some embodiments of the invention, for example, include more than one feed of steam, for example a first steam flow before a primary reformer or pre-reformer, and a second steam flow before the HTS converter. In such a case, all the steam feeds are considered for the calculation of the global ratio.

The applicant has found that, in the above case, the water produced in the pure autothermal reformer, on in the secondary reformer fired with oxygen or oxygen enriched air, by reaction of hydrogen and methane with the oxygen, is significantly higher compared to the conventional air-fired process. Accordingly, the amount of steam directed to the reforming can be reduced, being compensated by the water which is internally produced by the process, particularly in the secondary or autothermal reformer. In particular, the applicant has found that the global steam-to-carbon ratio of the front end can be significantly lower than 2.6, still using a HTS converter. This finding is in sharp contrast with the prior art, where 2.6 was considered the lower bound for use of high-temperature shift.

Preferably, the temperature of the high-temperature shift is greater than 300° C. and more preferably in the range 320 to 500° C.

Some embodiments of the invention include a pre-reforming stage, which means that a pre-reformer is installed upstream the primary or autothermal reformer.

The hydrocarbon feedstock is preferably a desulphurized natural gas.

The feedstock is normally mixed with steam before the primary reforming or autothermal or, when provided, before the pre-reforming step. In some embodiments of the invention, at least one further addition of steam is provided, for example the effluent of the secondary or the autothermal reforming step is mixed with a further steam, before the high-temperature shift step. This further addition of steam is an optional feature and may be provided to ensure a proper operation of the HTS converter, when appropriate.

In embodiments with no further addition of steam, it is preferred that the first reforming step includes a pre-reforming step. Hence, a pre-reformer is installed upstream the first reforming step (primary reformer or autothermal reformer). Accordingly, the feed of said pre-reforming step is the hydrocarbon feedstock mixed with steam, said feed having a steam-to-carbon ratio equal to said global ratio, and no further steam is added during the process.

Various embodiments of the invention may provide any of the following features, or a combination thereof:
  addition of steam, preferably before the step of high-temperature shift;
  mixing an amount of the fresh hydrocarbon feedstock with the effluent of the primary steam reforming, prior to the second reforming step;
  when pre-reforming is effected, mixing a portion of pre-reformed gas with the effluent of the primary steam reforming, said portion of pre-reformed gas bypassing the step of primary reforming In accordance, the steam-to-carbon ratio of the pre-reforming or of the primary reforming step or autothermal reforming may vary, despite the global ratio being lower than 2.6 as desired. Some preferred embodiments are stated in the dependent claims.

For example, a preferred embodiment provides that said first reforming step includes a pre-reforming and a primary steam reforming, the pre-reforming is carried out with a first steam-to-carbon ratio and the primary steam reforming is carried out with a second steam-to-carbon ratio which is equal to or greater than said first ratio, while both said first and second ratio are lower than the global ratio. Preferably, said first ratio is in the range 0.5 to 2, while said second ratio is around 1.5-2. Then, the synthesis gas obtained after the second reforming step is mixed with steam, prior to its feeding to high-temperature shift, raising the global steam-to-carbon ratio of the front end.

Adding steam upstream of the HTS converter has the advantage of less steam in the pre-reformer, primary reformer and secondary reformer. This option is preferred, in particular, when an existing front-end is revamped according to the invention, since it reduces the duty of the primary reformer (which is often a bottleneck of the plant) and of the waste heat boiler which is normally installed downstream the secondary reformer. Revamping these items is expensive and, hence, a reduction of their duty is an advantage.

According to further embodiments, the process comprises reforming in an autothermal reformer (ATR) without a previous step of primary reforming.

The autothermal reformer may be preceded by a pre-reformer. The pre-reformer enables operation of the ATR at low S/C such as less than 1.5 without risk of carbon deposition when preheating the ATR feed, moreover it enables preheating safely the ATR feed to high temperatures such as 600° C. which saves oxygen.

Further aspects of the invention are a front-end for production of ammonia synthesis gas, and a method for revamping a front-end for production of ammonia synthesis gas, according to the attached claims.

An aspect of the invention, in particular, is a method of revamping a front-end of an ammonia plant, wherein said front-end comprises a primary reforming stage and an air-fired secondary reforming stage, and also comprises a high-temperature shift converter with an iron based catalyst and running at a temperature greater than 320° C., and wherein the original front-end operates with a global steam-to-carbon ratio of 2.6 or greater. The method is characterized in that the secondary reforming stage is modified to operate with oxygen or oxygen-enriched air, with at least 50% oxygen, as oxidant stream, instead of air, and in that the amount of the hydrocarbon feedstock and the amount of steam fed to the front-end are regulated in such a way that the global steam-to-carbon ratio of the revamped front-end is 2.6 or less.

The above can be accomplished by replacing the existing secondary reformer with a new secondary reformer, or by modifying the existing secondary reformer. The method will normally include the provision of a line feeding oxygen or oxygen-enriched air to the secondary reformer and, if necessary, of means to provide said oxygen (or oxygen for air enrichment), such as an air separation unit (ASU).

Another revamping method can be accomplished by adding a new ATR in parallel to the existing primary and secondary reformers, the new ATR optionally preceded by a pre-reformer, and mixing the effluent of the ATR with the effluent of the existing secondary reformer upstream the HTS. The global S/C ratio (calculated as the total steam divided by the total carbon moles added to the existing primary and secondary reformers and HTS and new ATR and prereformer if installed) is less than 2.6

According to various embodiments, as recited in the claims, the method may include the installation of a steam line for the addition a predetermined amount of steam to the synthesis gas leaving the secondary reforming stage, prior to admission into the high-temperature shift converter, in order to regulate the global SC ratio. In some embodiments, the method comprises the installation of a bypass line of the reforming stage, arranged in such a way that a portion of the feedstock bypasses the first reforming stage and is sent directly to the second reforming stage. In further embodiments, the primary reforming stage includes a pre-reformer, the method may include the provision of a bypass line of the primary reformer for a portion of the effluent of said pre-reformer, so that said portion is sent directly to the second reforming stage.

It can be said that the invention, in comparison with the prior art, reduces the admission of steam (and, hence, the SC ratio) by introducing more oxygen in the secondary reforming stage, which is now fed with oxygen or oxygen enriched air instead of air. The applicant has found that, although an oxygen or rich air feed is expensive to provide, this solution proves to be convenient, since the flow rates are greatly reduced and, surprisingly, a HTS converter can be used at steam-to-carbon ratio much lower than prior art.

An advantage of the invention is that, for a given production, the duty of the primary steam reformer is reduced by around 10-20% or even more. The synthesis gas flow (m3/h) through the front-end, for a given production of ammonia, can be reduced by around 30%, which is a great advantage in terms of size/cost of the plant.

When the invention is applied to the revamping, the above advantage can be turned into more capacity with the existing equipment. As mentioned above, the existing plant commonly use a HTS converter and keeping said HTS (despite the low SC ratio) is an advantage, which means no need of expensive replacement of the converter and/or the catalyst.

A feature of the invention is a reduction of the duty of the primary reformer. The duty of the primary reformer, and of the secondary reformer as well, can be calculated referring to heat value [MW] of the fuel consumed in the primary or secondary reformer. A specific duty can be defined with reference to tons of ammonia produced. In the prior art, the duty of the primary reformer is commonly greater than that of the secondary reformer, e.g. the duty of the primary reformer around 140% of the duty of the secondary reformer. According to some embodiments of the invention, the duty of the primary reformer is equal to or even lower than the duty of the secondary reformer. In preferred embodiments, the duty of the primary reformer is 70-100% of the duty of the secondary reformer.

It appears that, if there is no primary reformer upstream the ATR, its duty is zero, hence the ratio of the duty of the SMR to the ATR is also zero.

The invention will be elucidated with reference to some preferred and non-limiting embodiments illustrated in FIGS. 1 to 8, wherein:

FIGS. 1 to 5 are schemes of embodiments of the invention with primary and secondary reforming;

DESCRIPTION OF PREFERRED EMBODIMENTS

Figure 6:
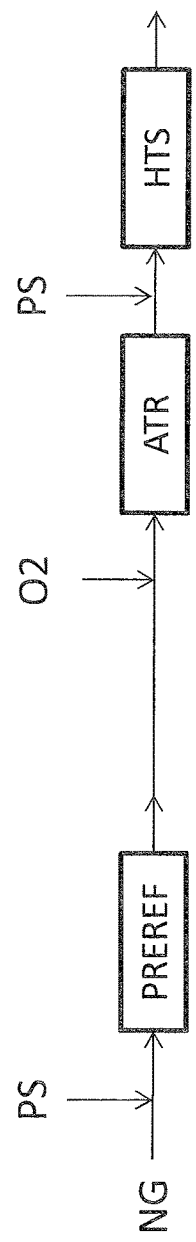
FIGS. 6 to 8 are schemes of embodiments of the invention with autothermal reforming.

Referring to FIGS. 1 to 8:
PREREF denotes a pre-reformer,
REF1 denotes a primary steam reformer, which is usually a tube reformer,
REF2 denotes a secondary reformer,
ATR denotes an autothermal reformer (ATR) if no upstream primary reformer (REF1) is installed HTS denotes a high-temperature shift converter,
PS denotes a flow of steam,
NG denotes a feedstock of natural gas,
O2 denotes a current of oxygen or oxygen-rich air which is the oxidant stream fed to the secondary reformer REF2.

FIG. 1 shows a first embodiment of the invention, where the front-end includes a pre-reformer PREREF upstream the primary reformer REF1. A natural gas feedstock NG is mixed with a first steam current PS and enters the pre-reformer PREREF. The pre-reformed gas leaving the pre-reformer is fed to the primary reformer REF1 and the gas leaving said primary reformer is fed to the oxygen-fired autothermal secondary reformer REF2. The reformed gas leaving said secondary reformer REF2 is mixed with a second amount of steam PS, and then enters the high-temperature shift converter HTS which operates at around 320-500° C. with an iron based catalyst, to convert CO into CO2. Then, the gas leaving said converter HTS is further treated according to known techniques, typically removal of carbon dioxide and (optionally) methanation.

The removal of carbon dioxide may be carried out with any of the following techniques:

In FIG. 1, the pre-reformer and the primary reformer operate at a low steam-to-carbon ratio, for example around 1.5, while the addition of the second amount of steam PS before the shift converter HTS raises the global steam-to-carbon ratio to 2.2-2.4.

FIG. 2 shows a second embodiment where the feed of the pre-reformer PREREF, that is the natural gas NG mixed with steam PS, has a steam-to-carbon ratio equal to said global ratio, and no further steam is added during the process. In particular, no further steam is added before the shift converter HTS. In this embodiment, the steam-to-carbon ratio is preferably around 2.4.

FIG. 3 shows a third embodiment, with no pre-reformer. A portion of the available feedstock bypasses the first steam reformer REF1. Accordingly, a first portion of the available feedstock NG is mixed with steam PS and enters the primary reformer REF1; a second remaining portion of said feedstock, on the other hand, is mixed the effluent of said primary reformer REF1. The resulting mixture is added with an oxygen stream O2 before it enters the secondary reformer REF2. A second amount of steam PS, as in FIG. 1, is mixed with the effluent of said secondary reformer REF2, before admission into the shift converter HTS.

In this case, the steam reformer REF1 is run at a high steam-to-carbon ratio which is, for example, around 2.7-3, due to the portion of feedstock bypassing the reformer. Preferably, said second portion of the feedstock NG, which bypasses the primary reformer, is around 30% of the available feedstock.

FIG. 4 shows a fourth embodiment which is similar to FIG. 3, but includes a pre-reformer PREREF. The bypass portion of feedstock, as shown, bypasses both the pre-reformer and the primary reformer REF1.

FIG. 5 shows a fifth embodiment which is a variant of FIG. 4. The full amount of natural gas NG, mixed with steam PS, is fed to the pre-reformer PREREF. However, a portion of the effluent of said pre-reformer bypasses the subsequent primary reformer REF1, being mixed with the gas leaving said primary reformer. A second amount of steam PS, also in this case, is mixed with the effluent of the autothermal reformer REF2.

FIG. 6 shows a sixth embodiment. The full amount of natural gas NG, mixed with steam PS, is fed to the pre-reformer PREREF. There is no primary reformer. The product of pre-reforming is routed to the autothermal reformer ATR fired with oxygen. A second amount of steam PS is mixed with the effluent of the autothermal reformer.

Figure 7:
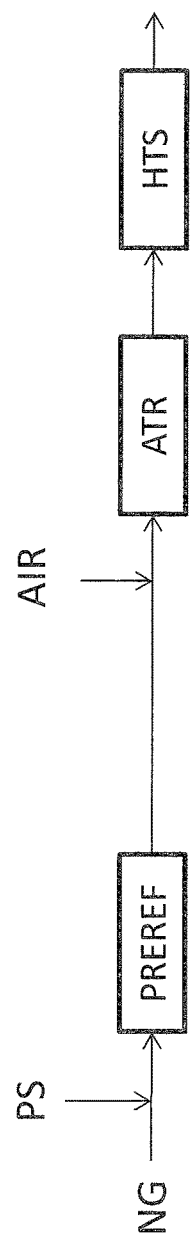

FIG. 7 shows a seventh embodiment, identical to 6 except for the autothermal reformer ATR being fired with air.

Figure 8:
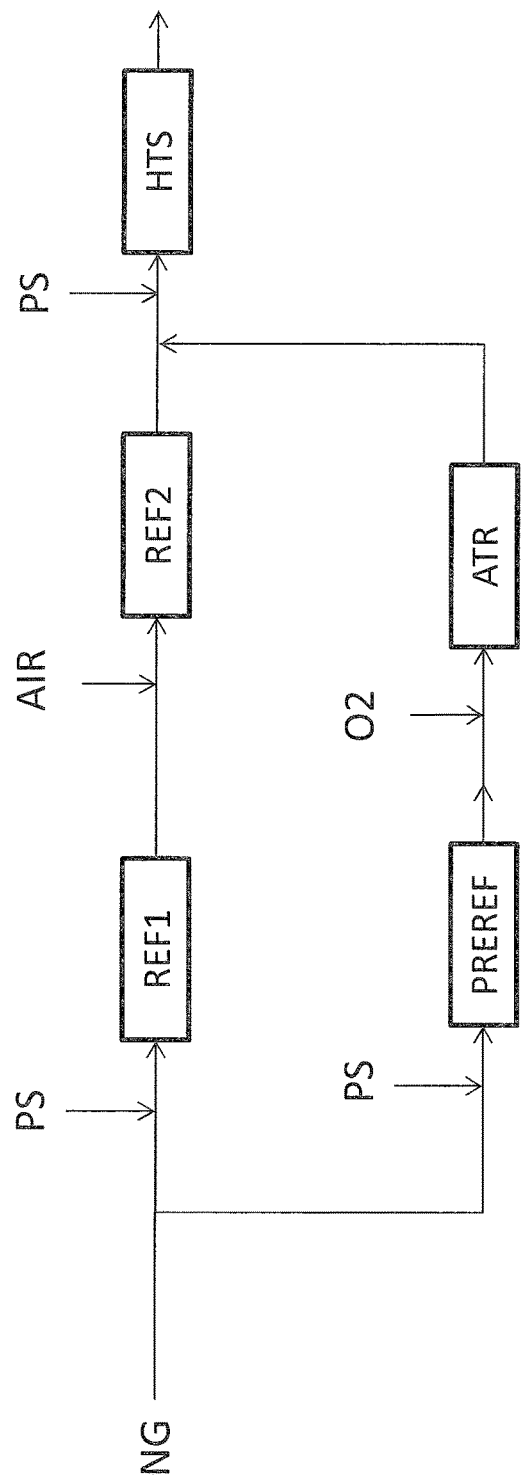

FIG. 8 shows an eighth embodiment which is a preferred embodiment for revamping an existing line comprising a primary reformer REF1 and a secondary reformer REF2. Said line is revamped by adding a new line with an autothermal reformer ATR. The natural gas feed NG is split between the line comprising a primary reformer REF1 and a secondary reformer REF2, and the newly added line comprising a prereformer PREREF and an autothermal reformer ATR. Steam PS is added to the feed NG both at the inlet of primary reformer REF1 and of pre-reformer PREREF. The product of the secondary reformer REF2 and the product of autothermal ATR are joined upstream of the shift converter HTS, and mixed with steam PS In all the above embodiments, the primary reformer REF1 operates preferably at a pressure around 30 bar, inlet temperature around 500° C. and outlet temperature around 750-800° C. The outlet temperature of the secondary reformer REF2 is around 1000° C. The outlet temperature of the autothermal reformer ATR is around 1000° C.

In all the above embodiments, a low-temperature shift converter may be installed downstream the converter HTS. After the shift, a carbon dioxide removal section is normally provided. It should be noted that the synthesis gas does not contain nitrogen and hence the invention allows using a PSA (pressure swing absorption) or LNW (liquefied nitrogen wash).

EXAMPLES

The following table 1 compares a prior art front end with a primary steam reformer and a secondary reformer, and global steam-to-carbon ratio of 2.6, with five examples which relate, respectively, to embodiments of FIG. 1, FIG. 2, FIG. 3, FIG. 6 and FIG. 7. The examples relate to a production of 3275 kmol/h of hydrogen. In the table, SMR denotes the steam methane reforming; RP denotes the reducing potential RP and S/DG denotes the steam/dry gas ratio (see above definitions).

TABLE 1

|  | Prior art | Ex. 1 (FIG. 1) | Ex. 2 (FIG. 2) | Ex. 3 (FIG. 3) | Ex. 4 (FIG. 6) | Ex. 5 (FIG. 7) |
|---|---|---|---|---|---|---|
| S/C ratio, overall | 2.6 | 2.2 | 2.37 | 2.15 | 2.1 | 1.9 |
| S/C inlet SMR | 2.6 | 1.5 | 2.37 | 2.7 | N/A | N/A |
| S/C inlet Prereformer | — | 1.5 | 2.37 | — | 1.0 | 0.5 |
| S/DG, inlet HTS | 0.40 | 0.51 | 0.48 | 0.48 | 0.68 | 0.43 |
| RP, inlet HTS | 1.47 | 1.64 | 1.64 | 1.65 | 1.2 | 1.2 |
| Natural Gas [kmol/h] | 1008 | 1054 | 998 | 1048 | 1208 | 1436 |
| Steam [kmol/h] | 2722 | 2318 | 2366 | 2254 | 2537 | 2729 |
| Oxygen [kmol/h] | (process air) | 377 | 337 | 420 | 733 | 626 [1] |
| Hydrogen [kmol/h] | 3275 | 3275 | 3275 | 3275 | 3275 | 3275 |
| SMR cat.tubes duty [MW] | 44.6 | 32.8 | 39.3 | 33.1 | 0 | 0 |
|  | 100% | 74% | 88% | 74% | 0% | 0% |

TABLE 1-continued

|  | Prior art | Ex. 1 (FIG. 1) | Ex. 2 (FIG. 2) | Ex. 3 (FIG. 3) | Ex. 4 (FIG. 6) | Ex. 5 (FIG. 7) |
|---|---|---|---|---|---|---|
| Syngas flow rate [t/h] | 106 | 71 | 69 | 71 | 74 | 168 [2] |
|  | 100% | 67% | 66% | 67% | 70% | 94% [3] |

[1] (in the air stream)
[2] (99 excluding N2)
[3] (based on flow excluding N2)

It can be noted that the duty of the steam methane reformer (primary reformer) is lower by 26% (ex. 1), 12% (ex. 2) and 26% (ex. 3), despite the same production of hydrogen. Furthermore, the syngas flow rate is considerably lower, being around 66-67% of the prior-art, also due to firing of the secondary reformer with oxygen instead of air. The size of a new plant can be reduced accordingly or, in a revamping, a larger capacity for a given size can be obtained.

The table indicates also the values of the reducing potential RP and steam/dry gas S/DG, as above defined, which are such to allow the use of the iron based catalyst, despite the low steam-to-carbon ratio between 2 and 2.37 in the examples. It can be observed that the values of S/DG are highest for the cases with ATR only, and that the values of RP are lowest for the cases with ATR only, this suggests that even lower global S/C values can be used for the cases with ATR only.

The following table 2 shows the reduced duty of the primary reformer, compared to the prior art.

Values for examples 4 and 5 are not indicated (the steam reformer duty is zero).

TABLE 2

|  | Prior art | Ex. 1 (FIG. 1) | Ex. 2 (FIG. 2) | Ex. 3 (FIG. 3) |
|---|---|---|---|---|
| NH3 production based on 3275 kmol/h H2 flow [t/h] | 37 | 37 | 37 | 37 |
| SMR duty [MW] | 45 | 33 | 39 | 33 |
| Specific SMR duty [MWh/t NH3] | 1.2 | 0.9 | 1.1 | 0.9 |
| Fuel burnt in ATR (assumed 100% CH4) [kmol/h] | 145 | 189 | 169 | 210 |
| ATR duty [MW] | 32 | 42 | 38 | 47 |
| Specific ATR duty [MWh/t NH3] | 0.9 | 1.1 | 1.0 | 1.3 |
| Specific SMR + ATR duty [MWh/t NH3] | 2.1 | 2.0 | 2.1 | 2.2 |
| SMR/ATR duty | 138% | 78% | 104% | 71% |

The invention claimed is:

1. A process for producing ammonia synthesis gas from a hydrocarbon-containing feedstock in a front-end, the process comprising the steps of:
   steam reforming of said feedstock, obtaining a synthesis gas comprising hydrogen, carbon monoxide and carbon dioxide;
   a treatment of said synthesis gas including shift of carbon monoxide and subsequent removal of carbon dioxide, wherein:
   the shift of the synthesis gas includes a step of high-temperature shift at a temperature greater than 300° C. with an iron-based catalyst;
   the global steam-to-carbon molar ratio of the front end is 2.6 or less; and wherein said steam reforming comprises:

a first reforming step including a primary steam reforming and optionally including a pre-reforming before said primary steam reforming, thus obtaining a first reformed gas;

a second reforming step with a stream of an oxidant, thus obtaining a synthesis gas comprising hydrogen, carbon monoxide and carbon dioxide;

said steps of first and second reforming being performed in series, said second reforming step being carried out by using oxygen or enriched air comprising at least 50% oxygen, as the oxidant stream.

2. The process according to claim 1, said global steam-to-carbon molar ratio being in the range 1.5 to 2.6.

3. The process according to claim 1, said first reforming step including a pre-reforming step, the feed of said pre-reforming step being the hydrocarbon feedstock mixed with steam, said feed having a steam-to-carbon molar ratio equal to said global molar ratio, and no further steam being added during the process.

4. The process according to claim 1, wherein the synthesis gas obtained after said second reforming step being then mixed with steam, prior to its feeding to the high-temperature shift, in order to raise the global steam-to-carbon molar ratio of the front end.

5. The process according to claim 4, wherein said first reforming step includes a pre-reforming step, and where the pre-reforming and the primary steam reforming are carried out with a low steam-to-carbon molar ratio which is lower than said global molar ratio.

6. The process according to claim 5, wherein said low molar ratio is less than 2.

7. The process according to claim 4, wherein the primary steam reforming is carried out with a steam-to-carbon molar ratio which is greater than said global molar ratio, and an amount of fresh hydrocarbon feedstock is mixed with the effluent of the primary steam reforming, prior to said second reforming step.

8. The process according to claim 7, the steam-to-carbon molar ratio of the primary steam reforming being in the range 2.7 to 3.

9. The process according to claim 4, wherein said first reforming step includes a pre-reforming and a primary steam reforming, the pre-reforming is carried out with a first steam-to-carbon molar ratio and the primary steam reforming is carried out with a second steam-to-carbon molar ratio which is equal to or greater than said first molar ratio, while both said first and second molar ratio are lower than the global molar ratio.

10. The process according to claim 9, said first molar ratio being in the range 0.5 to 2, and said second molar ratio being around 1.5-2.

11. The process according to claim 9, wherein the effluent of the primary steam reforming step is mixed with an amount of fresh hydrocarbon.

12. The process according to claim 9, wherein an amount of the pre-reformed gas leaving said pre-reforming step is mixed with the effluent of the primary steam reforming, thus bypassing said primary reforming.

13. The process according to claim 1, wherein said global steam-to-carbon molar ratio is in the range 2.2 to 2.4.

14. The process according to claim 1, including also a low-temperature shift which is carried out after the high-temperature shift and at around 200° C., a carbon dioxide removal section and optionally a methanation section.

15. The process according to claim 1, said hydrocarbon feedstock being desulphurized natural gas.

16. The process according to claim 1, said temperature of the high-temperature shift being in the range 320 to 500° C.

17. The process according to claim 5, wherein said low molar ratio is around 1.5.

18. The process according to claim 6, wherein said low molar ratio is around 1.5.

19. A method of revamping a front-end of an ammonia plant, said front-end producing ammonia synthesis gas by steam reforming of a hydrocarbon-containing feedstock,
wherein said front-end comprises a primary reforming stage and an air-fired secondary reforming stage, and also comprises a high-temperature shift converter with an iron based catalyst, and
wherein the original front-end operates with a global steam-to-carbon molar ratio of 2.6 or greater, wherein:
the amount of the hydrocarbon feedstock and the amount of steam fed to the front-end are regulated in such a way that the global steam-to-carbon molar ratio of the revamped front-end is 2.6 or less; and
said secondary reforming stage is modified to operate with oxygen or enriched air with at least 50% oxygen as oxidant stream, instead of air.

20. The method according to claim 19, including the installation of a steam line (PS) for the addition a predetermined amount of steam to the synthesis gas leaving the secondary reforming stage prior to admission into the high-temperature shift converter.

21. The method according to claim 19, including the provision of a hydrocarbon feedstock bypass line, arranged in such a way that a portion of the feedstock bypasses said first reforming stage and is sent directly to the second reforming stage.

22. The method according to claim 19, wherein the primary reforming stage includes a pre-reformer, and the method including the provision of a bypass line of the primary reformer for a portion of the effluent of said pre-reformer, so that said portion is sent directly to the second reforming stage.

23. The method according to claim 19, comprising the installation of an autothermal reformer (ATR) in parallel with the existing primary and secondary reformers, said autothermal reformer being fed with a portion of the natural gas feed and steam, the method also comprising the routing of the effluent from said newly installed autothermal reformer to the high-temperature shift converter, and mixing of the effluent from said autothermal reformer with the effluent from the existing primary and secondary reformers.

* * * * *